(12) United States Patent
Ikegami et al.

(10) Patent No.: US 9,574,605 B2
(45) Date of Patent: Feb. 21, 2017

(54) MOTION GUIDE DEVICE

(71) Applicant: THK CO., LTD., Tokyo (JP)

(72) Inventors: Nobuyuki Ikegami, Tokyo (JP);
Tsuyoshi Yamamoto, Tokyo (JP);
Fumiaki Morita, Tokyo (JP); Manabu Sato, Tokyo (JP); Kentaro Hikomoto, Tokyo (JP); Mitsumasa Wada, Tokyo (JP); Takuya Horie, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 14/398,598

(22) PCT Filed: May 10, 2013

(86) PCT No.: PCT/JP2013/003002
§ 371 (c)(1),
(2) Date: Nov. 3, 2014

(87) PCT Pub. No.: WO2013/168434
PCT Pub. Date: Nov. 14, 2013

(65) Prior Publication Data
US 2015/0093055 A1   Apr. 2, 2015

(30) Foreign Application Priority Data

May 11, 2012   (JP) ................................ 2012-109023
May 9, 2013   (JP) ................................ 2013-099134

(51) Int. Cl.
*F16C 29/06*   (2006.01)
*F16C 29/00*   (2006.01)

(52) U.S. Cl.
CPC ........... *F16C 29/005* (2013.01); *F16C 29/064* (2013.01); *F16C 29/065* (2013.01);
(Continued)

(58) Field of Classification Search
CPC ... F16C 29/0607; F16C 29/065; F16C 29/005; F16C 29/0642; F16C 29/06; F16C 29/0609; F16C 29/064; F16C 2226/60
See application file for complete search history.

(56) References Cited

U.S. PATENT DOCUMENTS 6,217,217 B1 *   4/2001   Teramachi ...................... 384/44
6,261,001 B1 *   7/2001   Teramachi ...................... 384/44
(Continued)

FOREIGN PATENT DOCUMENTS

JP          7-91446 A       4/1995
JP       2005-42767 A       2/2005
(Continued)

OTHER PUBLICATIONS

International Search Report dated Jul. 23, 2013 issued in corresponding application No. PCT/JP2013/003002.
(Continued)

*Primary Examiner* — Alan B Waits
(74) *Attorney, Agent, or Firm* — Westerman, Hattori, Daniels & Adrian, LLP

(57) ABSTRACT

A motion guide device includes a plurality of rolling element guide members provided along the entire length of a rolling element rolling surface so as to guide the unloaded side of a plurality of rolling elements that perform a rolling movement under load between the rolling element rolling surface and a loaded rolling element rolling surface. The rolling element guide member includes a beam member an outer member including a rolling element guide surface for guiding the unloaded side of the rolling elements, and the beam member and the outer member are insert-molded. Such a structure provides the motion guide device including the rolling element guide member that enables low cost manufacturing of a complex shape and capability of secure installation and guidance of the rolling elements with no (Continued)

deflection and can be adapted for use in various types by optionally selecting a connecting means.

14 Claims, 11 Drawing Sheets

(52) U.S. Cl.
CPC ...... *F16C 29/0607* (2013.01); *F16C 29/0609* (2013.01); *F16C 2226/60* (2013.01)

(56) References Cited

U.S. PATENT DOCUMENTS

| | | | |
|---|---|---|---|
| 7,066,650 B2* | 6/2006 | Ishihara | 384/44 |
| 7,204,036 B2* | 4/2007 | Kato et al. | 33/706 |
| 7,434,999 B2* | 10/2008 | Kuwabara | 384/44 |
| 7,832,930 B2* | 11/2010 | Geka et al. | 384/44 |
| 7,862,234 B2* | 1/2011 | Kuwabara et al. | 384/44 |
| 7,950,852 B2* | 5/2011 | Kondo | 384/15 |
| 8,123,408 B2* | 2/2012 | Nishiwaki | 384/44 |
| 8,967,862 B2* | 3/2015 | Hsu | 384/45 |
| 2005/0018933 A1 | 1/2005 | Ishihara | |
| 2014/0241652 A1* | 8/2014 | Yamazaki et al. | 384/43 |

FOREIGN PATENT DOCUMENTS

| | | |
|---|---|---|
| JP | 2005-42847 A | 2/2005 |
| JP | 2005-98355 A | 4/2005 |
| JP | 3898679 B2 | 3/2007 |

OTHER PUBLICATIONS

Office Action dated Jan. 6, 2016, issued in counterpart Chinese Patent Application No. 201380024520.X, with English translation. (9 pages).

Office Action dated Aug. 19, 2016, issued in counterpart Chinese Patent Application No. 201380024520.X, with Partial English translation. (7 pages).

* cited by examiner

II-II cross-sectional view

MOTION GUIDE DEVICE

TECHNICAL FIELD

The present invention relates to a motion guide device, such as a linear guide, that guides a moving body such as a table moving in a straight line or in a curve.

BACKGROUND ART

A motion guide device, which is a mechanical element for guiding linear movement or curvilinear movement of a moving body such as a table and in which rolling elements such as rollers are interposed between guide portions, provides a smooth movement so that the motion guide device is used in various fields such as robots, machine tools, semiconductor and LCD manufacturing equipment, and medical equipment.

A linear guide, which is a type of motion guide device, includes a track rail mounted on a base and a moving block which is assembled to the track rail so as to be movable relative to one another and on which a moving body is mounted. The track rail is provided with a rolling element rolling surface extending in a longitudinal direction. The moving block is provided with a loaded rolling element rolling surface opposing the rolling element rolling surface and a rolling element circulation path for circulating rolling elements. The rolling elements are rollably interposed between the rolling element rolling surface of the track rail and the loaded rolling element rolling surface of the moving block. When the moving block moves linearly relative to the track rail, the rolling elements interposed between the track rail and the moving block perform a rolling movement and endlessly circulate through the rolling element circulation path.

In such a motion guide device, the rolling elements that endlessly circulate in line in the rolling element circulation path are required to perform a smooth rolling movement. This is because if the rolling elements do not endlessly circulate in an aligned state, for example if skew occurs in which the rolling element is inclined with respect to the normal axis of rotation, high-accuracy guiding movement is inhibited by causing wear on the rolling element and the rolling surface, for example, and this results in a short life. Accordingly, a conventional motion guide device is provided with a rolling element guide member along the entire length of a loaded rolling element rolling surface so as to guide the unloaded side of rolling elements that perform a rolling movement under load between a rolling element rolling surface and a loaded rolling element rolling surface. The rolling element guide member used in the conventional motion guide device is disclosed as a "guide member" in the following Patent Literature 1.

CITATION LIST

Patent Literature

Patent Literature 1: JP 2005-98355 A

SUMMARY OF THE INVENTION

Problems to be Solved by the Invention

Meanwhile, the conventional rolling element guide member is typically made of a single material such as resin or metal. Since the rolling element guide member is an elongated member provided along the entire length of the loaded rolling element rolling surface, the rolling element guide member made of resin causes unwanted deflection in the rolling element guide member due to an external force based on the skew when a skew of the rolling element occurs in use. Alternatively, the rolling element guide member made of metal causes disadvantages due to metal-to-metal contact with the rolling element and those having a complex shape cannot be manufactured at a low cost, for example. That is, for the rolling element guide member used in the conventional motion guide device, it is desirable to enable low cost manufacturing of a complex shape and capability of secure installation and guidance of rolling elements with no deflection or the like. If a connecting means of the rolling element guide member can be optionally selected depending on applications and specifications of the motion guide device, the same part can be adapted for use in various types of motion guide devices and thus manufacturing costs is also reduced through common parts.

An object of the present invention, which has been made in view of the above problems, is to provide a motion guide device including a rolling element guide member that enables low cost manufacturing of a complex shape and capability of secure installation and guidance of rolling elements with no deflection or the like and can be adapted for use in various types by optionally selecting a connecting means depending on applications and specifications.

Means for Solving the Problems

A motion guide device according to the present invention includes: a track member on which a rolling element rolling surface is formed; a moving member on which a loaded rolling element rolling surface opposing the rolling element rolling surface is formed and which has a rolling element return path extending substantially parallel to the loaded rolling element rolling surface; a pair of cover members that are provided at both front and rear ends in the moving direction of the moving member and have a redirection path connecting the loaded rolling element rolling surface and the rolling element return path; a plurality of rolling elements arranged rollably in a rolling element circulation path defined by the loaded rolling element rolling surface, the rolling element return path, and the redirection path; and a plurality of rolling element guide members provided along the entire length of the loaded rolling element rolling surface so as to guide the unloaded side of the plurality of rolling elements that perform a rolling movement under load between the rolling element rolling surface and the loaded rolling element rolling surface. The rolling element guide member includes a beam member to form a main structural material and an outer member including a rolling element guide surface for guiding the unloaded side of the rolling elements, and the beam member and the outer member are insert-molded.

Effects of the Invention

The present invention provides a motion guide device provided with a rolling element guide member that enables low cost manufacturing of a complex shape and capability of secure installation and guidance of rolling elements with no deflection or the like and can be adapted for use in various types by optionally selecting a connecting means depending on applications and specifications.

BRIEF DESCRIPTION OF THE DRAWINGS

FIGS. 6(a) and FIG. 6(b) illustrate a front view and a side view, respectively.

FIG. 7(a) is a side view and FIG. 7(b) is a VII-VII cross-sectional view of FIG. 7(a).

FIG. 11(a) is a side view and FIG. 11(b) is a XI-XI cross-sectional view of FIG. 11(a).

MODE FOR CARRYING OUT THE INVENTION

A preferred embodiment of the present invention will now be described with reference to the drawings. The following embodiment is not intended to limit the claimed invention, and all combinations of the features described in the embodiment are not necessarily essential to means for solving of the invention.

Figure 1:
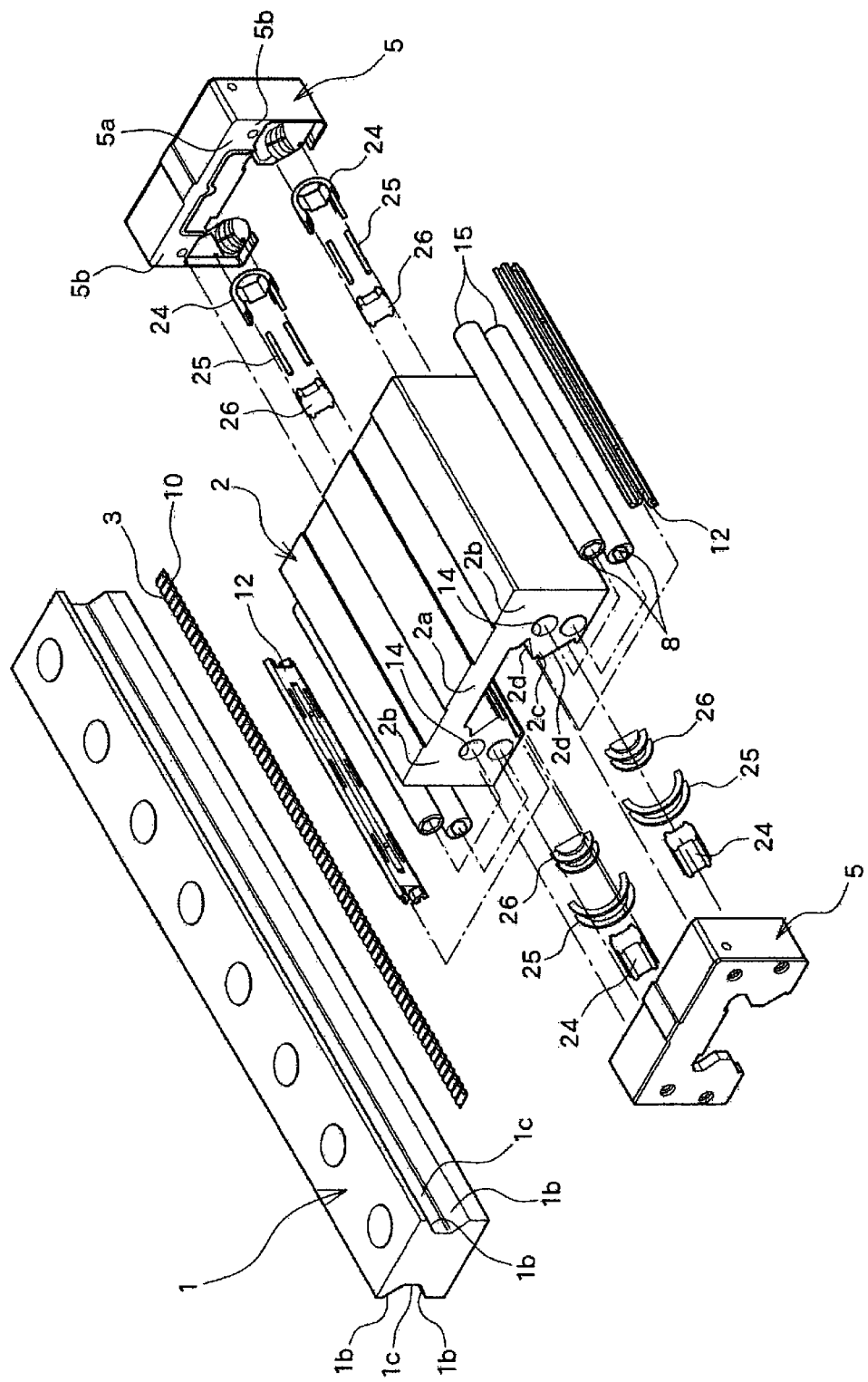
FIG. 1 is a diagram illustrating a linear guide as a motion guide device according to this embodiment and in particular illustrates an exploded perspective view of the linear guide.
Figure 2:
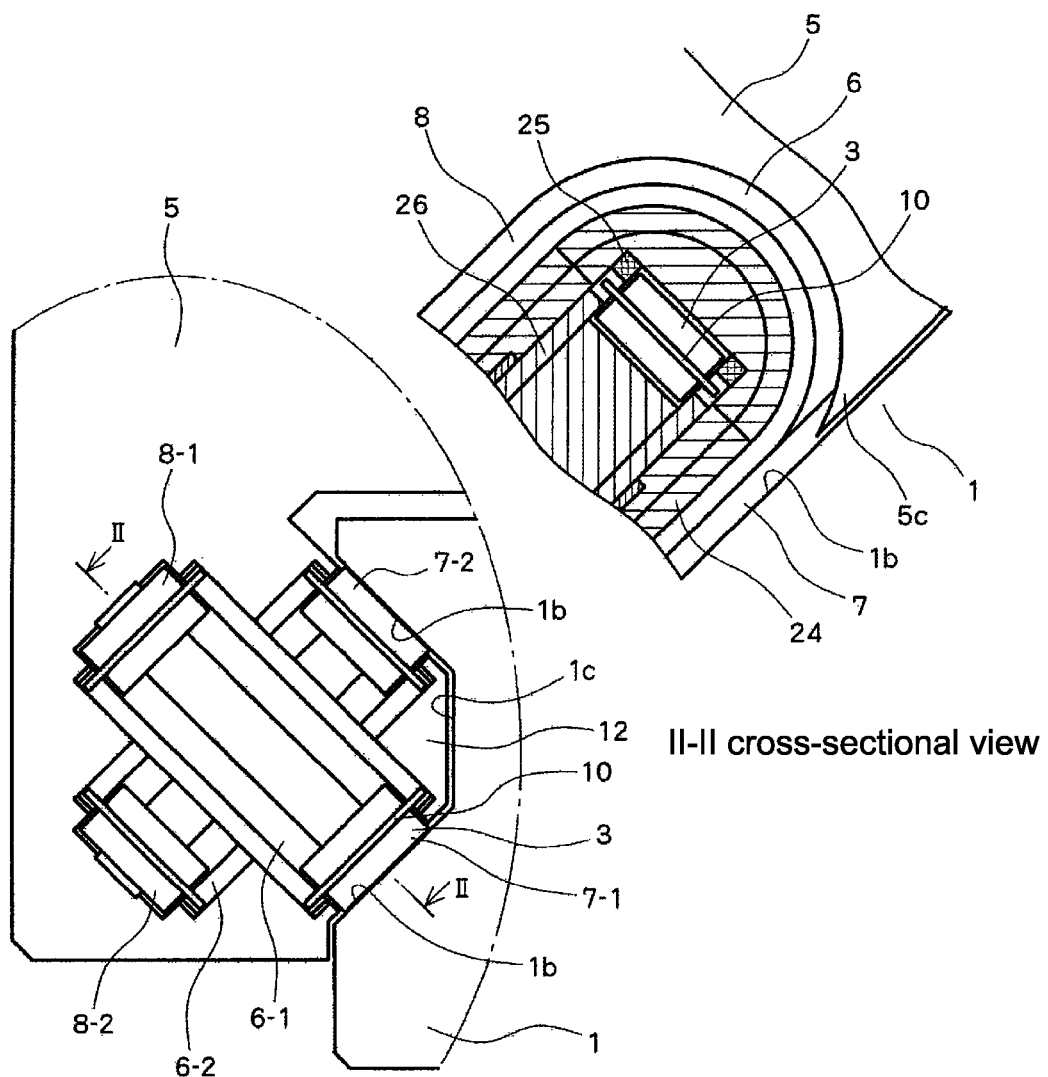
FIG. 2 is a diagram illustrating a linear guide as a motion guide device according to this embodiment and in particular illustrates a schematic structure of a main part in a circulation structure of the linear guide.

FIGS. 1 and 2 are diagrams illustrating a linear guide as a motion guide device according to this embodiment. In particular, FIG. 1 illustrates an exploded perspective view of the linear guide and FIG. 2 illustrates a schematic structure of a main part in a circulation structure of the linear guide.

The linear guide according to this embodiment includes a track rail 1 extending straight as a track member and a moving block 2 as a moving member that is reciprocally movably mounted on the track rail 1 through rollers 3 as a plurality of rolling elements, and guides a moving body such as a table moving in a straight line, for example. This embodiment uses the rollers 3 with less elastic deformation as the rolling elements to achieve high rigidity. Of course, other rolling elements such as balls or various rollers may be used as the rolling elements of the present invention. The bottom surface of the rail is in contact with a base and the rail is secured by bolts or the like from the top surface toward the bottom surface.

The track rail 1 is elongated with a generally rectangular cross-section, extending straight. Each of the left and right sides of the track rail 1 are provided with roller rolling surfaces 1b on which the rollers 3 roll longitudinally and a constricted surface 1c. The left and right sides of the track rail 1 are provided with a total of four roller rolling surfaces 1b, two vertically on each side, as the rolling element rolling surface.

The moving block 2 has a central portion 2a opposing the top surface of the track rail 1 and side wall portions 2b that extends downward from the left and right sides of the central portion 2a and opposes the left and right sides of the track rail 1. The side wall portion 2b of the moving block 2 has a projecting portion 2c that is fitted to the profile of the track rail 1. The projecting portion 2c is provided with loaded roller rolling surfaces 2d corresponding to the roller rolling surfaces 1b as a loaded rolling element rolling surface. The left and right side wall portions 2b of the moving block 2 are provided with a total of four loaded roller rolling surfaces 2d, two vertically on each side.

A plurality of rollers 3 made of steel are arranged between the roller rolling surface 1b of the track rail 1 and the loaded roller rolling surface 2d of the moving block 2. The rollers 3 are rotatably and slidably retained in alignment by a roller retainer 10. The roller retainer 10 used in this embodiment has a plurality of separating portions interposed between the rollers 3 and a guiding band as a connection band having flexibility for connecting the separating portions. Such a structure enables the rollers 3 to be rotatably retained in alignment.

The side wall portion 2b of the moving block 2 is provided with through-holes 14 extending parallel to and at a predetermined distance from the upper and lower loaded roller rolling surfaces 2d. A roller return path component 15 for defining a roller return path 8 is inserted into the through-hole 14. The roller return path component 15 is comprised of a pair of half pipes formed by cutting an elongated pipe-shaped member into two along its axial direction. The inner periphery of the roller return path component 15 is provided with the roller return path 8. After insertion into the through-hole 14, the roller return path component 15 is secured to the moving block 2, being supported by end plates 5 as a cover member at both ends.

The right and left side edges of the loaded roller rolling surfaces 2d of the moving block 2 are provided with an elongated rolling element guide member 12 formed by insert molding a beam member and an outer member. The rolling element guide member 12 has a guide groove for guiding the guiding band of the roller retainer 10 in order to prevent the rollers 3 from dropping out of the loaded roller rolling surfaces 2d when the moving block 2 is unmounted from the track rail 1. The rolling element guide member 12 guides the upper side of the roller retainer 10 moving on a lower loaded roller rolling surface 2d (i.e., the unloaded side of the roller 3) and guides the lower side of the roller retainer 10 moving on an upper loaded roller rolling surface 2d (i.e., the unloaded side of the roller 3).

In this embodiment, the lower side of the roller retainer 10 moving on the lower loaded roller rolling surface 2d and the upper side of the roller retainer 10 moving on the upper loaded roller rolling surface 2d are guided by wall surface shapes $2d_1$ following the loaded roller rolling surface 2d formed on the moving block 2. Alternatively, an elongated plastic holding member, being prepared in place of the metal wall surface shape $2d_1$, may guide the unloaded side of the roller 3, i.e., the lower side of the roller retainer 10 moving on the lower loaded roller rolling surface 2d and the upper side of the roller retainer 10 moving on the upper loaded roller rolling surface 2d.

Two loaded roller rolling paths 7-1, 7-2 (see FIG. 2), each of which is defined by the roller rolling surfaces 1b of the track rail 1 and the loaded roller rolling surface 2d of the moving block 2, are provided on each of the right and left side wall portions 2b of the moving block 2. Two roller return paths 8-1, 8-2 (see FIG. 2), each of which is defined by the roller return path component 15, are also provided vertically on each of the right and left side wall portions 2b of the moving block 2. The end plate 5 has redirection paths 6-1, 6-2 that three-dimensionally cross the loaded roller rolling paths 7-1, 7-2 and the roller return paths 8-1, 8-2.

The end plates 5 as the cover member are attached to the front and rear ends in the moving direction of the moving block 2. The end plate 5 has substantially the same cross-sectional shape as the moving block 2 and includes a horizontal portion 5a in contact with the central portion 2a of the moving block 2 and side wall portions 5b in contact with the side wall portions 2b of the moving block 2 (see FIG. 1). As illustrated in FIG. 2, the outer redirection path 6-1 of the side wall portion 5b connects the lower loaded roller rolling path 7-1 and the upper roller return path 8-1. The inner redirection path 6-2 of the side wall portion 5b connects the upper loaded roller rolling path 7-2 and the lower roller return path 8-2. That is, the outer redirection path 6-1 and the inner redirection path 6-2 are connected so as to three-dimensionally cross the loaded roller rolling paths 7 and the roller return paths 8. As illustrated in FIG. 1, each of the outer redirection path 6-1 and the inner redirection path 6-2 is defined by the end plate 5, a U-shaped member 24, and a half-cylindrical member 26. The left figure of FIG. 2 shows a state in which the U-shaped member 24 and the half-cylindrical member 26 are unattached from the end plate 5.

The U-shaped member 24 is formed generally U-shaped as a whole. The outer peripheral side of the U-shaped member 24 serves as the inner peripheral side of the outer redirection path 6-1, and the inner peripheral side of the U-shaped member 24 serves as the outer peripheral side of the inner redirection path 6-2. When the U-shaped member 24 is fitted into the end plate 5, the outer redirection path 6-1 is defined by the outer peripheral side of the outer redirection path 6-1 formed in the end plate 5 and the outer peripheral side of the U-shaped member 24.

When the U-shaped member 24 is fitted into the end plate 5, a portion of the outer peripheral side of the inner redirection path 6-2 formed in the end plate 5 is also connected to the inner peripheral side of the U-shaped member 24, and thus the outer peripheral side of the inner redirection path 6-2 is completed.

The outer peripheral surface of the half-cylindrical member 26 having a shape such as a half cylinder serves as the inner peripheral side of the inner redirection path 6-2. When the half-cylindrical member 26 is fitted into the end plate 5 after the U-shaped member 24 is fitted into the end plate 5, the inner redirection path 6-2 is defined by the end plate 5, the U-shaped member 24, and the half-cylindrical member 26.

A retainer guide member 25 is incorporated between the U-shaped member 24 and the half-cylindrical member 26. The retainer guide member 25 is provided in order to eliminate a "step" at the junction of the end plate 5 with the U-shaped member 24.

When the moving block 2 is moved relative to the track rail 1 after completion of the linear guide, the rollers 3 perform a rolling movement under load in the loaded roller rolling path between the roller rolling surface 1b of the track rail 1 and the loaded roller rolling surface 2d of the moving block 2. The roller 3 that has rolled to the end of the loaded roller rolling surface 2d of the moving block 2 is scooped by a scooper 5c provided on the end plate 5 as illustrated in FIG. 2 and enters the roller return path 8 extending parallel to the loaded roller rolling path 7 through the U-shaped redirection path 6. The roller 3 that has passed through the roller return path 8 enters the loaded roller rolling path 7 again through the opposite redirection path. The rollers 3 circulate through a circuit-like roller circulation path defined by the loaded roller rolling path 7, the redirection path 6, and the roller return path 8. Since inner and outer circuit-like roller circulation paths are provided, the rollers 3 endlessly circulate through each of the inner and outer circuit-like roller circulation paths.

In use of such a liner guide as a motion guide device, the rollers 3 endlessly circulating through the roller circulation path are required to perform a smooth rolling movement. This is because if skewing of the roller 3 occurs, for example, high-accuracy guiding movement is inhibited and this results in a short life. Accordingly, the rolling element guide member 12 according to this embodiment is configured to enable secure installation and guidance of the rollers 3 with no deflection or the like. In the following, the detailed structure of the rolling element guide member 12 according to this embodiment is described with reference to FIGS. 3 to 5.

Figure 3:
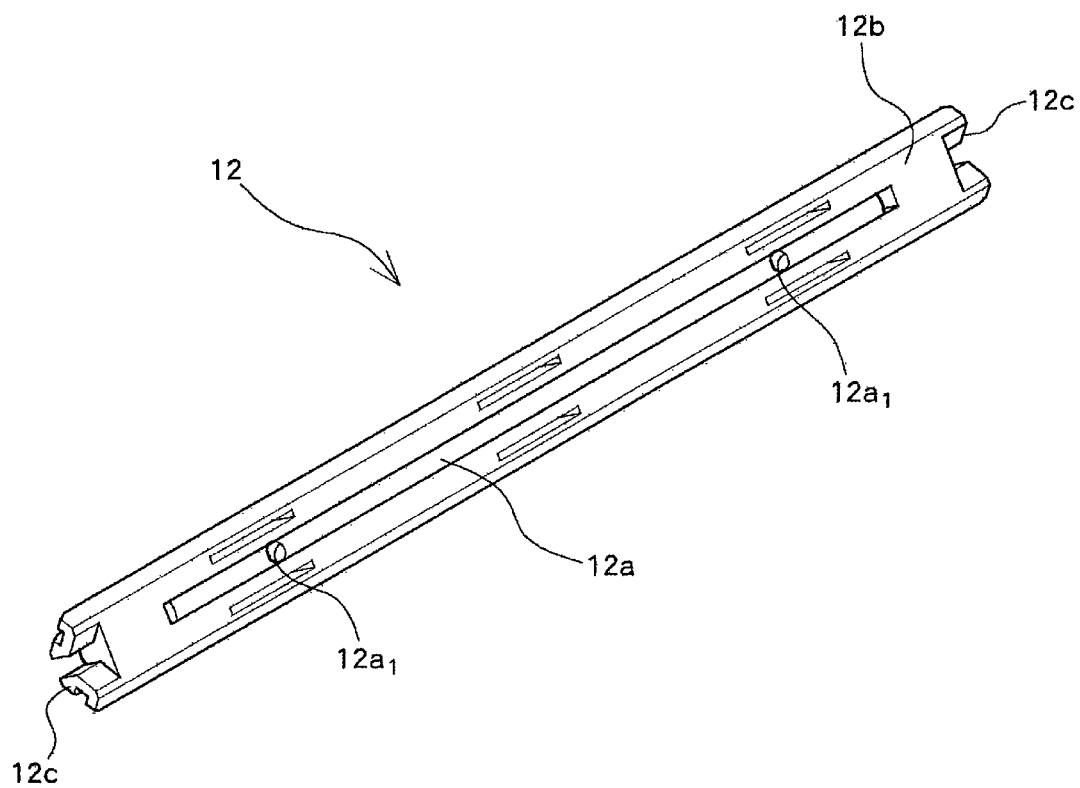
FIG. 3 is a perspective view illustrating an overall configuration of a rolling element guide member according to this embodiment.
Figure 4:
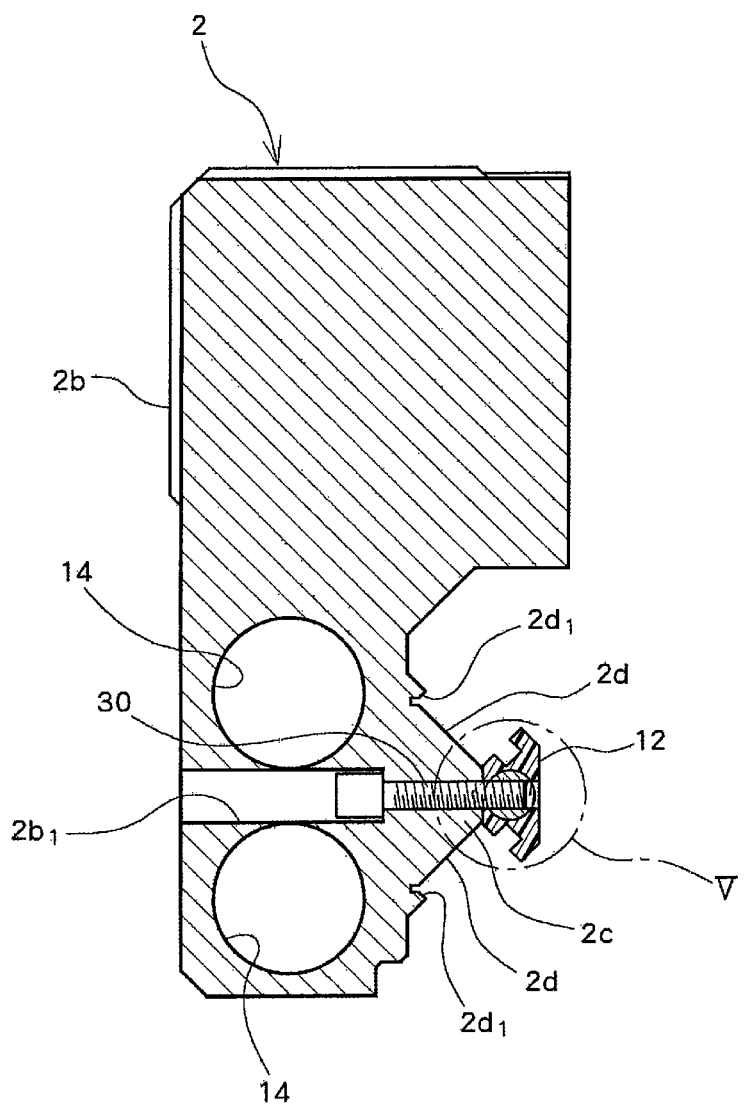
FIG. 4 is a schematic sectional view illustrating a state in which the rolling element guide member is assembled to a moving block of this embodiment.
Figure 5:
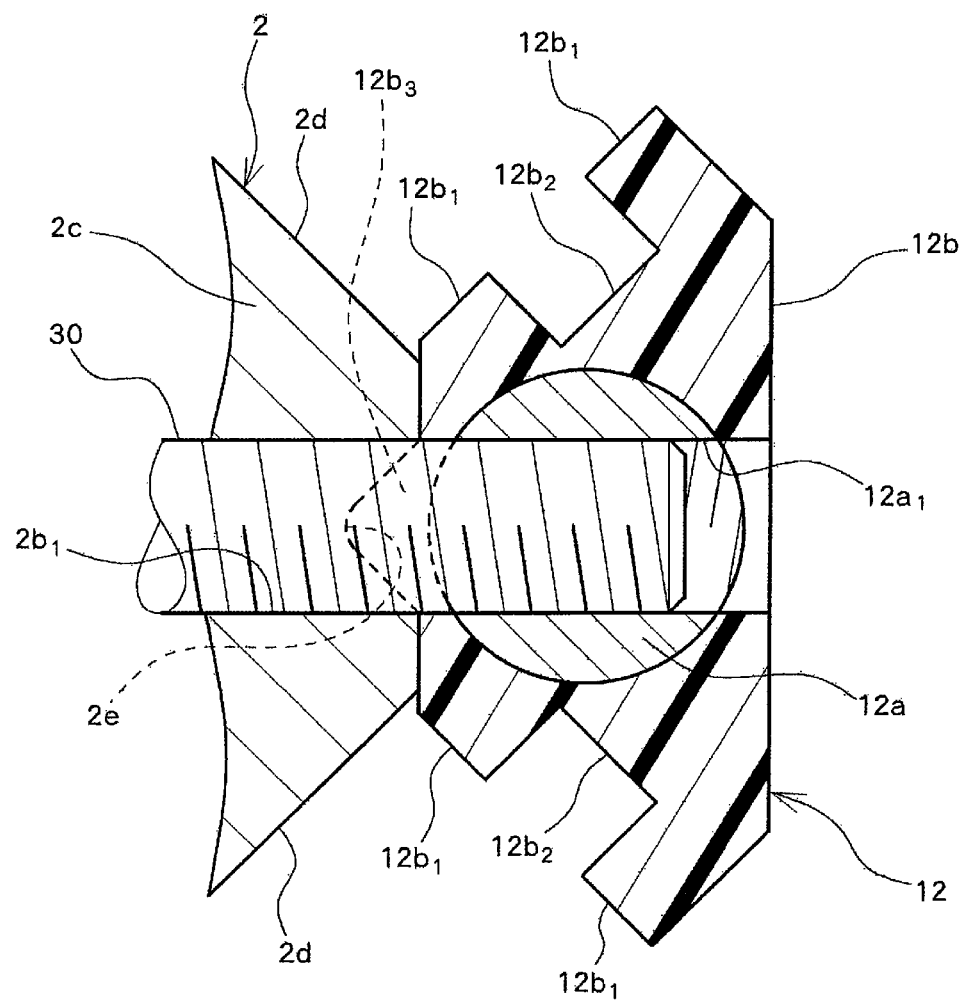
FIG. 5 is an enlarged view of a section indicated by the reference character V of FIG. 4.

Here, FIG. 3 is a perspective view illustrating an overall configuration of the rolling element guide member according to this embodiment. FIG. 4 is a schematic sectional view illustrating a state in which the rolling element guide member is assembled to the moving block of this embodiment. In addition, FIG. 5 is an enlarged view of a section indicated by the reference character V of FIG. 4.

The rolling element guide member 12 according to this embodiment is an elongated member provided along the entire length of the loaded roller rolling surface 2d, which member 12 guides the unloaded side of the rollers 3 that perform a rolling movement under load on the loaded roller rolling path between the roller rolling surface 1b of the track rail 1 and the loaded roller rolling surface 2d of the moving block 2. The rolling element guide member 12 according to this embodiment includes a beam member 12a made of a metal material to form a main structural material and an outer member 12b made of a resin material to form an outer shape including roller guide surfaces $12b_1$ for guiding the unloaded side of the roller 3.

Note that the rolling element guide member 12 according to this embodiment is subject to an external load from the rolling rollers 3. When the rolling element guide member 12 is subject to the external load, stress such as compression, tension, bending, shear, etc. is applied within the rolling element guide member 12. Of the members making up the rolling element guide member 12, the beam member 12a of this embodiment receives the stress or the like therein as described above and plays a role in causing the rolling element guide member 12 to function as a structural member. Meanwhile, the outer member 12b of this embodiment forms the outer shape of the rolling element guide member 12 and also has a function of reinforcing the beam member 12a by receiving part of external stress.

The beam member 12a employs a round bar available at a low cost, whereby a reduction of production costs can be achieved. The shape of the metal material that can be employed as the beam member according to the present invention is not limited to the illustrated one. For example, any material, such as an elongated rod, pipe, plate, wire, bar, flat square material, or extruded material, can be employed as long as the material can provide strength as a structural material and can insert-mold the outer member 12b made of a resin material therearound.

The beam member 12a is also provided with screw holes $12a_1$ as a connecting means according to the present invention. The rolling element guide member 12 can be connected to the moving block 2 by using the screw holes $12a_1$. Specifically, a screw 30 is inserted into a through-hole $2b_1$ formed in the side wall portion 2b of the moving block 2, and the screw 30 is screwed into the screw hole $12a_1$ of the beam member 12a, thereby firmly connecting the rolling element guide member 12 to the moving block 2.

Meanwhile, the outer member 12b has the roller guide surfaces $12b_1$ for longitudinally guiding the unloaded side of the roller 3 as well as guide grooves $12b_2$ for guiding the guiding band of the roller retainer 10. In particular, the roller guide surface $12b_1$ is configured to have an area covering the entire region of the unloaded side of the rollers 3. The function of the roller guide surface $12b_1$ and the guide groove $12b_2$ allows the rolling element guide member 12 of this embodiment to stably guide the rollers 3.

The outer member 12b is also provided with supporting shapes 12c, 12c as another connecting means according to the present invention at both ends in the longitudinal direction. The supporting shapes 12c, 12c are formed to be convex and are configured to fit into a concave (not shown) formed in the end plate 5. Thus, when the pair of end plates 5, 5 are attached so as to sandwich the moving block 2 with the rolling element guide member 12 being assembled to the moving block 2, the convex supporting shapes 12c, 12c and the concaves (not shown) of the pair of end plates 5, 5 fit to each other, thereby securing the rolling element guide member 12 to the moving block 2. While this embodiment shows the exemplary case where the supporting shapes 12c, 12c as another connecting means according to the present invention are fitted into the concave (not shown) formed in the end plate 5 as the cover member, a method of connecting the rolling element guide member 12 is not limited thereto. The method of connecting the rolling element guide member 12 can be a connecting means that is provided at both ends of the rolling element guide member 12 associated with the moving block 2 and is connected to at least part of the moving block 2. For example, a structure in which the outer member 12b and a circulation path component are joined and connected together may be employed.

In this way, in the rolling element guide member 12 according to this embodiment, a connecting means using the screw hole $12a_1$ and a connecting means using the supporting shapes 12c, 12c can be optionally selected. Thus, the rolling element guide member 12 according to this embodiment allows the connecting means to be selected depending on application and usage environment of the motion guide device. For example, when an external force applied to the rolling element guide member 12 is relatively small, using only strength provided by the beam member 12a as a structural material can maintain a fixed state with sufficient stability, in which case only the connecting means using the supporting shapes 12c, 12c may be employed. On the other hand, when an external force applied to the rolling element guide member 12 is large, a connection means using the screw hole $12a_1$ can be used in combination with and in addition to the connecting means using the supporting shapes 12c, 12c. The combined use of the two connecting means can maintain a stable attachment of the rolling element guide member 12 with no disadvantage such as the occurrence of deflection even if an external force applied to the rolling element guide member 12 is large.

This embodiment illustrates the case where the convex supporting shapes 12c, 12c are formed at both ends of the outer member 12b and the concaves are formed in the pair of end plates 5, 5. However, for the connection between the rolling element guide member and the moving member according to the present invention, it is sufficient that one of the two members is formed to be convex and the other is formed to be concave.

Further, the beam member 12a and the outer member 12b making up the rolling element guide member 12 according to this embodiment are configured to be an inseparable co-molded member by insert molding. That is, the rolling element guide member 12 according to this embodiment is provided with strength as a structural material by the beam member 12a made of a metal material and the outer member 12b is also made so as to surround the beam member 12a by insert molding, thereby achieving an inexpensive and complex outer shape. Thus, this embodiment, in which the outer member 12b made of a resin material enabling low cost manufacturing of a complex shape and the beam member 12a as a structural material that suppresses the occurrence of deflection are co-molded by insert molding technology, provides an unconventional rolling element guide member 12 that enables secure installation to the moving block 2 and reliable guidance of the rollers 3.

Still further, when the rolling element guide member 12 is viewed in cross-section as shown in FIG. 5, the rolling element guide member 12 according to this embodiment is configured such that the outer peripheral edge of the beam member 12a fits inside the outer peripheral edge of the outer member 12b. Note that the term "when the rolling element guide member 12 is viewed in cross-section, the outer peripheral edge of the beam member 12a fits inside the outer peripheral edge of the outer member 12b" does not mean that all of the outer peripheral surface of the beam member 12a is covered by the outer member 12b; rather it means that the outer peripheral edge of the beam member 12a fits inside the continuous outer peripheral edge of the outer member 12b when viewed in a cross-section. Accordingly, the present invention allows the outer peripheral surface of the beam member 12a to be partially exposed as illustrated in FIG. 3, and the screw holes $12a_1$ described above are preferably formed in such an exposed portion. Thus, the outer member 12b is configured to surround the outer peripheral edge of the beam member 12a when viewed in cross-section, and this increases shape stability of the rolling element guide member 12 and enables secure installation to the moving block 2 and reliable guidance of the rollers 3. Since the thickness of the outer member 12b surrounding the outer peripheral edge of the beam member 12a is set to be larger than a predetermined value, the fluidity of a resin material during insert molding is increased, which enables high-quality rolling element guide members 12 to be stably manufactured.

In this embodiment, the moving block side of the outer member 12b is provided with a convex $12b_3$, while the attachment location of the outer member 12b to the moving block 2 is provided with a concave 2e. Upon attachment of the outer member 12b to the moving block 2, the outer member 12b is assembled to the moving block 2 using the concave 2e of the moving block 2 and the convex $12b_3$ of the outer member 12b. This enables secure installation of the rolling element guide member 12 at a predetermined location of the moving block 2.

Note that, for the rolling element guide member of the present invention, the outer peripheral edge on the track rail 1 side of the beam member 12a at least when the rolling element guide member 12 is viewed in cross-section only needs to be formed so as not to protrude from the outer peripheral edge on the track rail side of the outer member 12b. For the side in contact with the moving block 2, it may be configured such that the outer peripheral edge of the beam member 12a protrudes from the outer peripheral edge of the outer member 12b and the beam member 12a is in direct contact with the moving block 2. That is, the track rail side of the rolling element guide member is opposed to the track rail 1 with a small gap therebetween so that the outer member 12b having a high flexibility and slidability is preferably located with its outer peripheral edge outside. On the other hand, for the moving block side of the rolling element guide member, the rolling element guide member only needs to be secured to the moving block so that the outer peripheral edge of either the beam member 12a or the outer member 12b can be located. By being provided with at least such configuration conditions, an unconventional rolling element guide member 12 can be provided that enables secure installation to the moving block 2 and reliable guidance of the rollers 3.

Although the preferred embodiment according to the present invention is described above, the scope of the invention is not limited to the scope of the above embodiment. Various changes or improvements can be made in the above embodiment.

For example, the roller retainer 10 used in the embodiment described above has the plurality of separating portions interposed between the rolling elements and the guiding band as a connection band having flexibility for connecting the separating portions so that the rolling elements are rotatably retained in alignment. Accordingly, the outer member 12b according to this embodiment has the roller guide surfaces $12b_1$ for guiding the unloaded side of the roller 3 as well as the guide grooves $12b_2$ for guiding the guiding band of the roller retainer 10. However, the motion guide device having the rolling element guide member according to the present invention is also applicable to a row of rolling elements with no roller retainer 10, namely a "full complement of rollers", in which case the rolling element guide member may not have the guide groove $12b_2$ for guiding the guiding band of the roller retainer 10.

When the outer member 12b is provided with the guide groove $12b_2$ as shown in this embodiment, the beam member 12a and the guide groove $12b_2$ are disposed in close proximity with each other when the rolling element guide member 12 is viewed in cross-section. The positional relationship between the beam member 12a and the guide groove $12b_2$ can be set according to the fluidity state of a resin material during insert molding so that the volume of the resin material is reduced as much as possible under moldable conditions, and thereby the strength of the rolling element guide member according to the invention is increased and manufacturing costs thereof are reduced.

When the rolling element guide member 12 is viewed in cross-section, as shown in FIG. 5, the rolling element guide member 12 according to this embodiment is configured such that the outer peripheral edge of the beam member 12a fits inside the outer peripheral edge of the outer member 12b. However, it is sufficient that the outer member according to the present invention is insert-molded on the outer peripheral side of the beam member 12a in a range capable of forming at least the roller guide surface $12b_1$ as a rolling element guide surface when the rolling element guide member 12 is viewed in cross-section. That is, to the extent that the outer member according to the invention has the same advantage as the rolling element guide member 12 of this embodiment described above, the insert molding range of the outer member for the beam member 12a can be reduced compared to the above embodiment. Thus, by controlling the molding range of the outer member, the strength of the rolling element guide member required for the invention is maintained and manufacturing costs are also reduced.

While the above embodiment shows the exemplary case where the two screw holes $12a_1$ are formed in the beam member 12a, the number of the screw holes $12a_1$ is optional.

The screw hole $12a_1$ formed in the beam member 12a may or may not be a through-hole.

The rolling element guide member according to the invention may be provided with a plurality of connecting means for connecting to the moving block 2 (moving member). In the embodiment described above, a connecting means using the screw holes $12a_1$ and a connecting means using the supporting shapes 12c, 12c provided at both ends in the longitudinal direction of the outer member 12b are illustrated. However, a connecting means of the present invention is not limited to the foregoing. For example, a connecting means other than the screw hole $12a_1$ may be used in which a rolling element guide member is formed as a frame-shaped member and is assembled by fitting the frame-shaped member into the moving block 2 (moving member). Even in the case where such a connecting means other than that illustrated in this embodiment, a connecting means using the screw hole and a connecting means other than the screw hole may be optionally selected or both the connecting means may be used together in the motion guide device of the present invention.

The rolling element guide member 12 according to this embodiment described above employs a round bar available at a low cost as the beam member 12a and a structure in which the outer member 12b made of a resin material is insert-molded around the round bar. In such a configuration, frictional force acts between the contact surfaces of the beam member 12a and the outer member 12b. As such, for example, if some external force acts on the rolling element guide member 12 during transportation and storage and twists the outer member 12b relative to the beam member 12a, the twisted state would be maintained by the action of the frictional force. The twisted state can be easily eliminated by a worker when the rolling element guide member 12 is installed, but that is troublesome for installation work so that a structure that does not produce a twist of the outer member 12b relative to the beam member 12a is needed.

Figure 6:
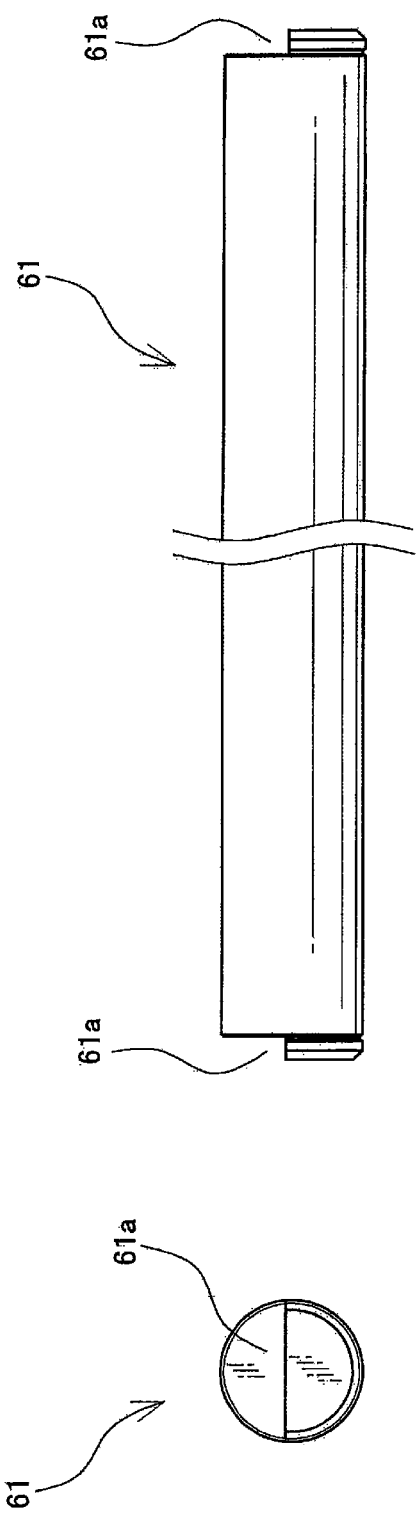
FIGS. 6(a) and 6(b) are diagrams illustrating a beam member according to a modification of this invention, where
Figure 7:
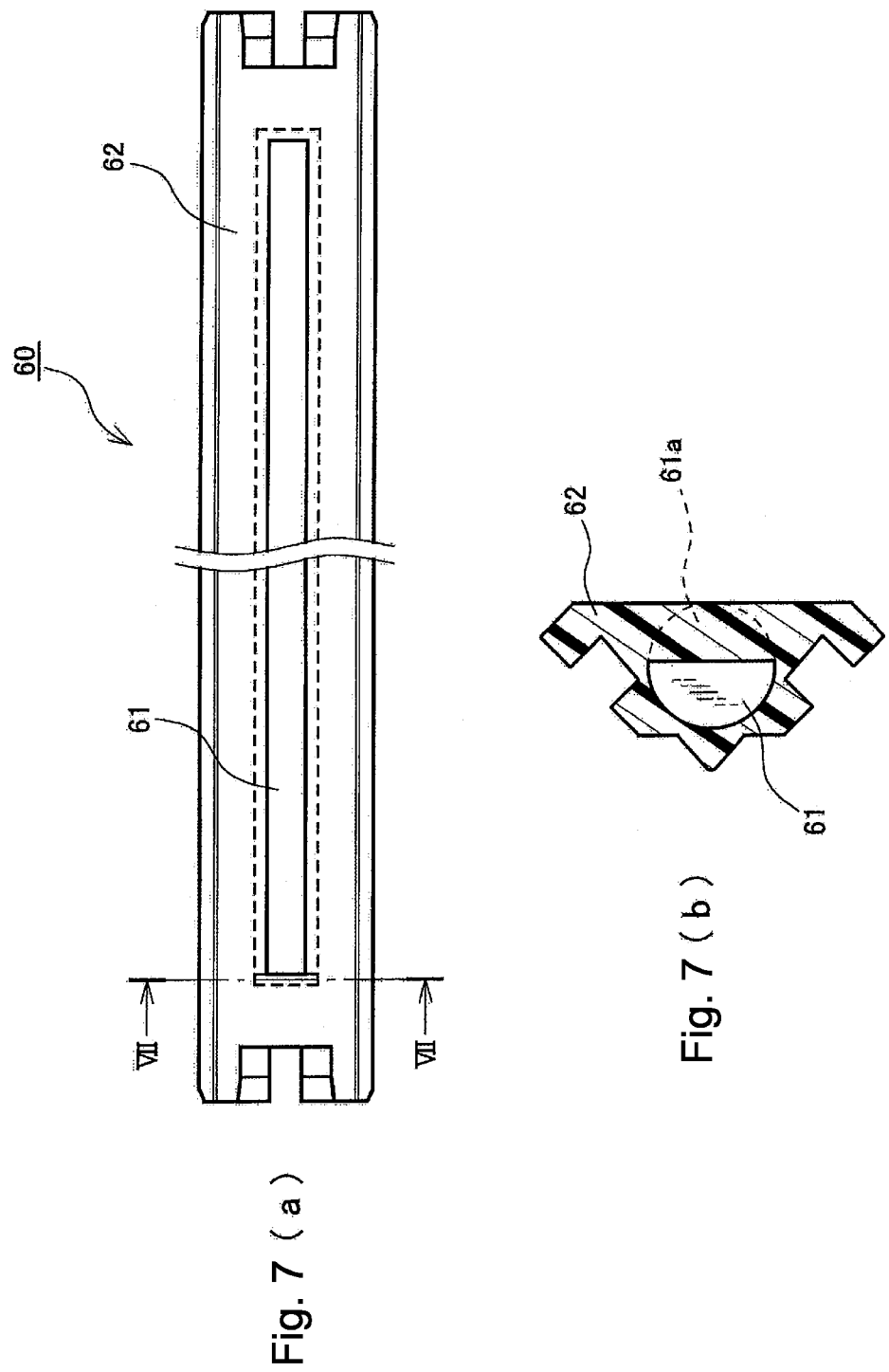
FIGS. 7(a) and 7(b) are diagrams illustrating a rolling element guide member into which the beam member according to the modification illustrated in FIG. 6 is incorporated, where

In order to satisfy the above requirement, the inventors have created a structure where the outer member 12b is not twisted relative to the beam member 12a. FIGS. 6(a) and 6(b) and 7(a) and 7(b) illustrate such a structure. FIGS. 6(a) and 6(b) are diagrams illustrating a beam member 61 according to a modification of the present invention, where FIGS. 6(a) and 6(b) illustrate a front view and a side view, respectively. FIGS. 7(a) and 7(b) are diagrams illustrating a rolling element guide member 60 into which the beam member 61 according to the modification illustrated in FIGS. 6(a) and 6(b) are incorporated, where FIG. 7(a) is a side view and FIG. 7(b) is a VII-VII cross-sectional view of FIG. 7(a).

In the modification illustrated in FIGS. 6(a) to 7(b), the beam member 61 is formed as a round bar and both ends of the round bar are provided with cut-away portions 61a that are created by removal process such as cutting or grinding. For the case of the above modification, the cut-away portion

61a is truncated to remove about half of the cylindrical round bar end, i.e., a region having a generally D-shape in a front view is removed. An outer member 62 is insert-molded around the beam member 61 above, at which time the resin forming the outer member 62 enters the cut-away portions 61a created by the removal process (see FIG. 7(b)). Such a structure integrates the beam member 61 and the outer member 62 that are prevented from rotating, thereby effectively preventing twist of the outer member 62 relative to the beam member 61. As a result, the shape of the rolling element guide member 60 is kept constant so that unnecessary work, such as, for example, eliminating twist during installation work, is not needed.

Figure 8:
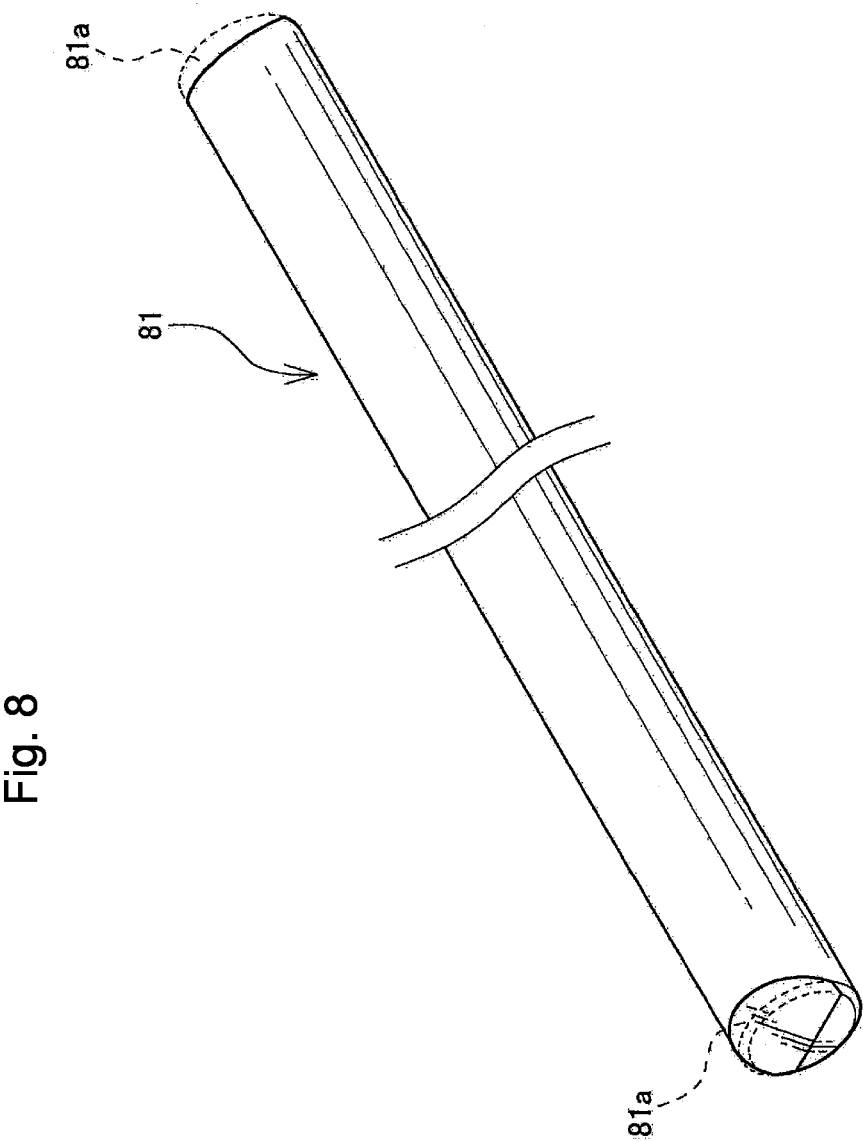
FIG. 8 is a diagram illustrating one of various embodiments of a cut-away portion applicable to the present invention.

The shape of the cut-away portion applicable to the present invention is not limited to the generally D-shaped one in a front view illustrated in FIGS. 6(a) to 7(b). Any configuration that can integrate the beam member and the outer member while preventing them from rotating may be employed. As illustrated in FIG. 8, for example, providing cut-away portions 81a as an inclined surface at both ends of a beam member 81 also can integrate the beam member 81 and the outer member while preventing them from rotating.

Figure 9:
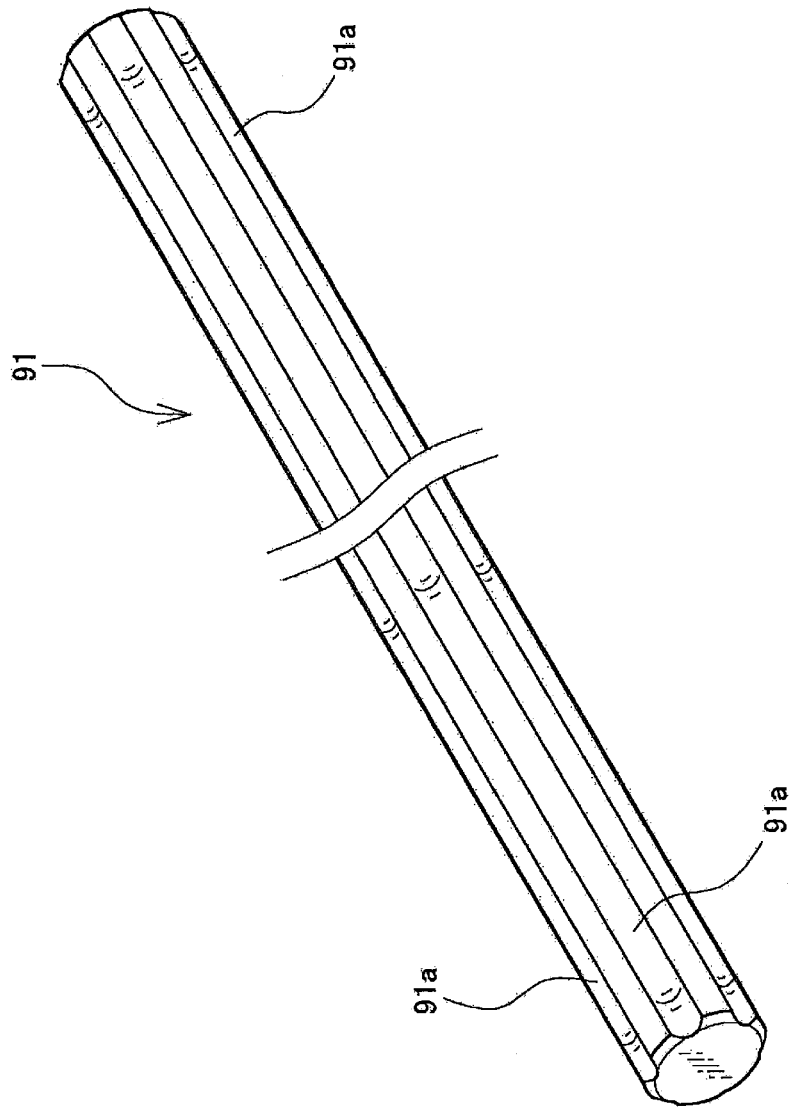
FIG. 9 is a diagram illustrating one of various embodiments of a cut-away portion applicable to the present invention.

Alternatively, as illustrated in FIG. 9, for example, providing cut-away portions 91a as a plurality of grooves extending in a longitudinal direction on the surface of a beam member 91 also can integrate the beam member 91 and the outer member while preventing them from rotating. Although the beam member 91 illustrated in FIG. 9 is provided with six grooves as the cut-away portions 91a formed over the entire longitudinal length of the beam member 91, the number and the range of the cut-away portions as the grooves can be varied on condition that they have the same advantage as the modifications described above.

Figure 10:
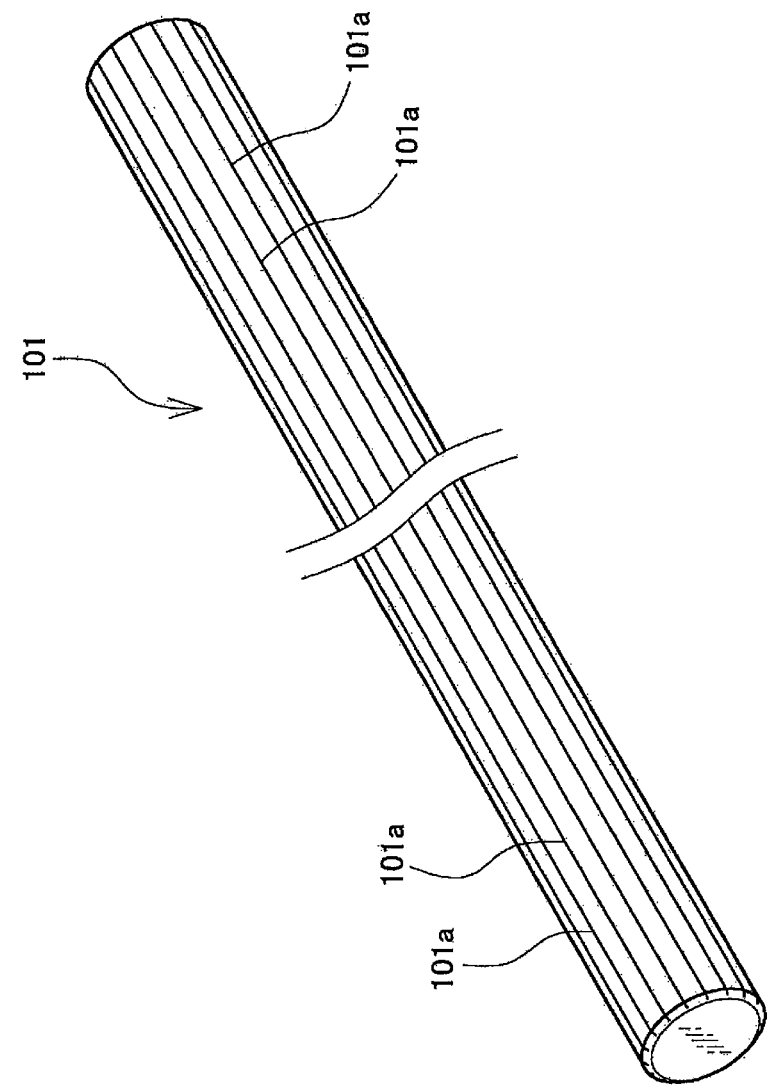
FIG. 10 is a diagram illustrating one of various embodiments of a cut-away portion applicable to the present invention.

Alternatively, as illustrated in FIG. 10, for example, knurling the surface of a beam member 101 also can integrate the beam member 101 and the outer member while preventing them from rotating. Although the beam member 101 illustrated in FIG. 10 is provided with knurled portions as cut-away portions 101a formed over the entire longitudinal length of the beam member 101, the range of the cut-away portions 101a formed by knurling can be varied on condition that they have the same advantage as the embodiment described above.

Figure 11:
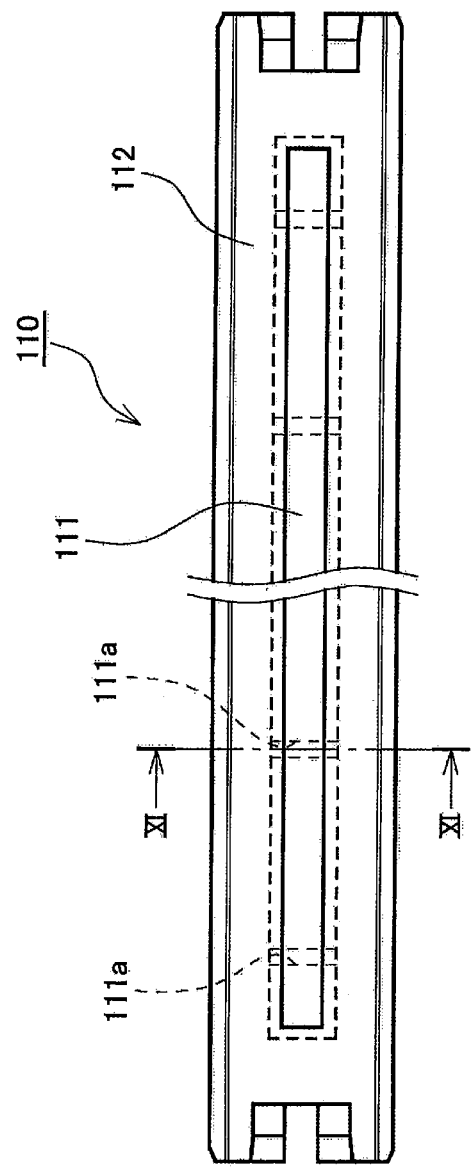
FIGS. 11(a) and 11(b) are diagrams illustrating still another rolling element guide member according to the present invention, where
Figure 11:
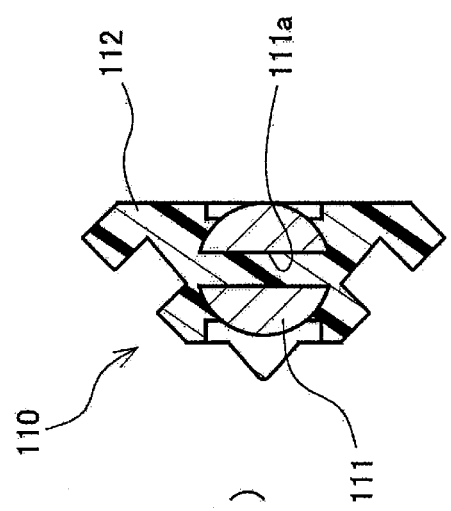

Alternatively, as illustrated in FIGS. 11(a) and 11(b), for example, cut-away portions 111a may be formed by providing through-holes in the direction perpendicular to the axial direction at any position of a beam member 111 according to the invention. FIGS. 11(a) and 11(b) are diagrams illustrating still another rolling element guide member 110 according to the invention, where FIG. 11(a) is a side view and FIG. 11(b) is a XI-XI cross-sectional view of FIG. 11(a). As illustrated in FIG. 11(b), providing the cut-away portion 111a as the through-hole in the beam member 111 causes the resin to enter the through-hole as the cut-away portion 111a during insert molding, which can integrate the beam member 111 and an outer member 112 while preventing them from rotating. This effectively prevents twist of the outer member 112 relative to the beam member 111. As a result, the shape of the rolling element guide member 110 is kept constant so that unnecessary work, such as, for example, eliminating twist during installation work, is not needed.

For the modifications illustrated in FIGS. 6(a) to 11(b), the resin as a part of the outer member enters the cut-away portions 61a, 81a, 91a, 101a, 111a even though the beam members 61, 81, 91, 101, 111 are oriented in any direction within a mold in insert molding, so that the insert molding operation is not complicated. Thus, the modifications described above have an advantageous effect that they effectively prevent the twist of the outer members 62, 112 relative to the beam members 61, 81, 91, 101, 111 without affecting the insert molding operation.

It is apparent from the claims that embodiments where such modifications or improvements are made also can be included within the scope of the present invention.

REFERENCE NUMERALS

1 Track rail, 1b Roller rolling surface (Rolling element rolling surface), 2 Moving block, 2d Loaded roller rolling surface (Loaded rolling element rolling surface), 3 Roller (Rolling element), 5 End plate (Cover member), 6 Redirection path, 7 Loaded roller rolling path (Loaded rolling element rolling path), 8 Roller return path (Rolling element return path), 12, 60, 110 Rolling element guide member, 12a, 61, 81, 91, 101, 111 Beam member, 12$a_1$ Screw hole, 12b, 62, 112 Outer member, 12$b_1$ Roller guide surface, 12$b_2$ Guide groove, 12$b_3$ Convex, 12c Supporting shape, 30 Screw, 61a, 81a, 91a, 101a, 111a Cut-away portion

The invention claimed is:

1. A motion guide device comprising:
a track member on which a rolling element rolling surface is formed;
a moving member on which a loaded rolling element rolling surface opposing the rolling element rolling surface is formed and which has a rolling element return path extending substantially parallel to the loaded rolling element rolling surface;
a pair of cover members that are provided at both front and rear ends in the moving direction of the moving member and have a redirection path connecting the loaded rolling element rolling surface and the rolling element return path;
a plurality of rolling elements arranged rollably in a rolling element circulation path defined by the loaded rolling element rolling surface, the rolling element return path, and the redirection path; and
a rolling element guide member provided along an entire length of the loaded rolling element rolling surface so as to guide an unloaded side of the plurality of rolling elements that perform a rolling movement under load between the rolling element rolling surface and the loaded rolling element rolling surface,
wherein the rolling element guide member comprises a beam member to form a main structural material and an outer member including a rolling element guide surface for guiding the unloaded side of the rolling elements,
wherein the beam member and the outer member are insert-molded,
wherein the outer member is insert-molded on an outer peripheral side of the beam member in a range capable of forming at least the rolling element guide surface when the rolling element guide member is viewed in cross-section,
wherein an outer periphery of the beam member is configured to fit inside an outer periphery of the outer member when the rolling element guide member is viewed in cross-section, and
wherein the beam member is an elongated cylindrical rod.

2. The motion guide device according to claim 1, wherein the beam member is provided with a connecting means and the rolling element guide member is configured to be connected to the moving member by using the connecting means.

3. The motion guide device according to claim 2, wherein at least part of the cylindrical rod is provided with a cut-away portion, and
insert molding is performed such that the outer member enters the cut-away portion.

4. The motion guide device according to claim 2, wherein the rolling element guide member is provided with another connecting means, other than the connecting means, for connecting to the moving member at both ends in the longitudinal direction.

5. The motion guide device according to claim 4, wherein at least part of the cylindrical rod is provided with a cut-away portion, and
insert molding is performed such that the outer member enters the cut-away portion.

6. The motion guide device according to claim 1, wherein at least part of the cylindrical rod is provided with a cut-away portion, and
insert molding is performed such that the outer member enters the cut-away portion.

7. The motion guide device according to claim 1, wherein the rolling element guide member is provided at each end with connecting means for connecting to the moving member at both ends in the longitudinal direction.

8. A motion guide device comprising:
a track member on which a rolling element rolling surface is formed;
a moving member on which a loaded rolling element rolling surface opposing the rolling element rolling surface is formed and which has a rolling element return path extending substantially parallel to the loaded rolling element rolling surface;
a pair of cover members that are provided at both front and rear ends in the moving direction of the moving member and have a redirection path connecting the loaded rolling element rolling surface and the rolling element return path;
a plurality of rolling elements arranged rollably in a rolling element circulation path defined by the loaded rolling element rolling surface, the rolling element return path, and the redirection path; and
a rolling element guide member provided along an entire length of the loaded rolling element rolling surface so as to guide a first unloaded side of the plurality of rolling elements that perform a rolling movement under load between the rolling element rolling surface and the loaded rolling element rolling surface,
wherein the rolling element guide member does not guide a second unloaded side of the plurality of rolling elements that perform the rolling movement under load between the rolling element rolling surface and the loaded rolling element rolling surface, the second unloaded side of the plurality of rolling elements being opposite the first unloaded side of the plurality of rolling elements,
wherein the rolling element guide member comprises a beam member to form a main structural material and an outer member including a rolling element guide surface for guiding the unloaded side of the rolling elements,
wherein the beam member and the outer member are insert-molded,
wherein the outer member is insert-molded on an outer peripheral side of the beam member in a range capable of forming at least the rolling element guide surface when the rolling element guide member is viewed in cross-section, and
wherein an outer periphery of the beam member is configured to fit inside an outer periphery of the outer member when the rolling element guide member is viewed in cross section, and
wherein the beam member is an elongated cylindrical rod.

9. The motion guide device according to claim 8, wherein the beam member is provided with a connecting means and the rolling element guide member is configured to be connected to the moving member by using the connecting means.

10. The motion guide device according to claim 9, wherein the rolling element guide member is provided with another connecting means, other than the connecting means, for connecting to the moving member at both ends in the longitudinal direction.

11. The motion guide device according to claim 10, wherein
at least part of the cylindrical rod is provided with a cut-away portion, and
insert molding is performed such that the outer member enters the cut-away portion.

12. The motion guide device according to claim 9, wherein
at least part of the cylindrical rod is provided with a cut-away portion, and
insert molding is performed such that the outer member enters the cut-away portion.

13. The motion guide device according to claim 8, wherein
at least part of the cylindrical rod is provided with a cut-away portion, and
insert molding is performed such that the outer member enters the cut-away portion.

14. The motion guide device according to claim 8, wherein the rolling element guide member is provided at each end with connecting means for connecting to the moving member at both ends in the longitudinal direction.

* * * * *